United States Patent
Ma

(10) Patent No.: US 6,206,786 B1
(45) Date of Patent: Mar. 27, 2001

(54) ROTATING SHAFT

(76) Inventor: Dejiang Ma, Madi Cun, Guoxian Xiang, Tongzhou District, Beijing 101109 (CN)

(*) Notice: Subject to any disclaimer, the term of this patent is extended or adjusted under 35 U.S.C. 154(b) by 0 days.

(21) Appl. No.: 09/324,408

(22) Filed: Jun. 2, 1999

(30) Foreign Application Priority Data

Jul. 16, 1998 (CN) .............................. 98 2 07221

(51) Int. Cl.[7] .................................................. F16C 1/26
(52) U.S. Cl. ........................ 464/178; 464/179; 464/7
(58) Field of Search .......................... 384/906; 403/356, 403/358; 464/7, 78, 179, 178

(56) References Cited

U.S. PATENT DOCUMENTS

| | | | |
|---|---|---|---|
| 5,181,837 | * | 1/1993 | Niemiec ............................ 417/350 |
| 5,462,489 | * | 10/1995 | Kan et al. .......................... 464/179 |
| 5,577,847 | * | 11/1996 | Nakamura et al. .................. 464/7 |
| 5,753,986 | * | 5/1998 | Ohtani ................................ 310/56 |
| 6,044,723 | * | 4/2000 | Eda et al. ....................... 74/388 PS |

* cited by examiner

Primary Examiner—B. Dayoan
Assistant Examiner—Aaron M Dunwoody
(74) Attorney, Agent, or Firm—Westman, Champlin & Kelly, P.A.

(57) ABSTRACT

A new type of rotating shaft, is registered in succession with a stepped shaft, a bush, a bearing lock sleeve, a jacket and bearings, in which the bush is rigidly connected with a bearing lock sleeve through a dowel, the bearings are matching with the stepped shaft and bearing lock sleeves by the round keyways respectively, oil filler points are set up on the jacket, bearing lock sleeve and bush, an oil reserving space being surrounded by the stepped shaft, jacket, and the liner outside the bearing. The advantages of rotating shaft is abrasive-resistant, no need of periodic maintenance, extremely convenient in mounting and dismantling, and is dispensable in bearing tightness adjustment.

7 Claims, 4 Drawing Sheets

ROTATING SHAFT

BACKGROUND OF THE INVENTION

The invention relates to a rotating shaft, more particularly to a new type of rotating shaft having small frictional resistance and various parts in movable fit.

Current rotating mechanisms such as the electric motors, fans, wheels etc chiefly consists of a shaft, bearings, a bearing lock sleeve, and a jacket etc. in tight stationary fit. These assembly methods of tight stationary fit caused imbalance of bearings in the bearing lack sleeve. Moreover, solid lubricants have been utilized. Consequently, stationary fit resulted in enlargement of bearing frictional resistance and vulnerability in various parts.

SUMMARY OF THE INVENTION

An object of the invention is to provide a new type of rotating shaft utilized in the field of mechanical engineering.

The object of the invention is achieved through the following modes:

A rotating shaft of the invention comprises a shaft, bearings, a bearing lock sleeve, a jacket, cap nuts and liners, characterized in that said shaft is a stepped shaft, i.e. the diameters of both ends on the shaft inserting to the bearing inner races are less than that of shaft middle part and are step shaped, while the diameter of middle flanged part on the steeped shaft being greater than the inner diameter of bearing inner race to restrict the bearings within a certain range of both ends on the stepped shaft. Furthermore, although no specific limitations have been prescribed on the diameter of flanged part on the stepped shaft, oversize diameter of flanged part not only brought to material wasted but also increased the weight of stepped shaft. Accordingly its excessive part may be 0.01–1 times thickness of the bearing inner race. Said stepped shaft, bearings, bearing lock sleeve and jacket are registered in succession, the bearing inner races are in movable fit with both ends of the stepped shaft, the bearing outer races are in movable fit with the bearing lock sleeve. Liners are set up outside the bearings, and the cap nuts are in threaded connection with the jacket; the above mentioned movable fit between the bearing inner race and the stepped shaft and between the bearing outer race and the bearing lock sleeve is designated in comparison with tight stationary fit between current bearings, shaft and bearing lock sleeve, the outer diameter of said stepped shaft inserting into the bearing inner race should be less than the bearing inner diameter, the inner diameter of said bearing lock sleeve should be greater than the bearing outer diameter. Under these conditions, the movable fit clearance is chiefly decided by machining precision, and shall be smaller in having higher machining accuracy; said bearings are registered into the bearing lock sleeve, whose length should exceed the sum of the length of middle flanged part on the stepped shaft and two bearing thicknesses.

Alternately, inner and outer race keyways can be installed onto said bearing, a round key is set up onto said bearing lock sleeve correspondingly, and is fitted with an outer race keyway of the bearing; a round key is also furnished onto said stepped shaft, and is matched with an inner race keyway of the bearing. Aforesaid round keys are slidable in the keyways, therefore, the round keys along the radial direction of stepped shaft serve to lock in a bearing outer race with a bearing lock sleeve and a bearing inner race with the stepped shaft. Nevertheless, a bearing can be movable within a certain range along an axial direction of the stepped shaft.

A liner is mounted outside said bearing, a cap nut is located outside the liner, and nut and jacket are in threaded connection. A sealed oil reservoir is formed in a space surrounded by the liner, stepped shaft and jacket, and lubricant oil can be injected via the oil filler points set up on the jacket, bearing lock sleeve into the bearings. Moreover, a bearing can also be restricted inside a liner, which enables the bearing to be solely slidable along a longitudinal direction of the stepped shaft between the flanged part and the liner.

Another rotating shaft of the invention comprises a shaft, bearings, a bearing lock sleeve, a bush, a jacket, cap nuts and liners. In comparison with conventional rotating shaft, it is characterized in that, a bush is added, a shaft, a bush, a bearing lock sleeve, a jacket and bearings are registered successively, in which said bush is invaginated into the bearing lock sleeve, functionality of the bush being the same as the above middle flanged part of the stepped shaft, i.e., the sliding range of bearings can be restricted and the bush and bearing lock sleeve are rigidly connected through a dowel.

In the rotating shaft of the above structure, since the spacing of bearings can be limited by a bush, therefore a common shaft may be employed. Furthermore, since a bush is added, in order to inject lubricating oil into the bearings, oil filler points are installed onto the jacket, bearing lock sleeve and bush. The structures of other parts in this rotating shaft of the invention are the same as relevant structures of above mentioned rotating shaft, and shall not be repeated in description.

Alternately, a bush need not be added into a rotating shaft and be replaced by a thicker bearing lock sleeve with both ends fabricated into recesses, which are inserted with the bearings in movable fit, and the recess length along axial direction should be greater than bearing thickness.

A third rotating shaft of the invention is a combination of two above rotating shafts, i.e. comprising a stepped shaft, bearings, a bush, a bearing lock sleeve, a jacket, cap nuts and liners. Said stepped shaft, bush, bearing lock sleeve, jacket and bearings are registered in succession, in which the bush length corresponds with (may be greater than, less than or equal to) the length of middle flanged part on the stepped shaft, while other structures are identical with relevant parts of the two above mentioned structures and are not repeated for description.

It is well known that, machining precision always exist in machinery fabrication, therefore, in the process of rotating shaft assembly, fully coaxial fitting cannot be achieved between the rotating shaft and two bearings, and between the bearings and auxiliary bearing lock sleeve. If the shaft with bearings and the bearings with bearing lock sleeve were in tight stationary fit, then resistance to ball rolling in the bearings shall be created by the stress resulted from imbalance. While in the rotating shaft of the above invention, movable fit being employed between the shaft (or stepped shaft) and two bearings and between the bearings and auxiliary bearing lock sleeve, clearances created from machining precision exist, consequently, stress resulted from mounting of above rotating shaft can be compensated, and resistance on bearings reduced. Said shaft rotates under nearly desirable undamped status, and the object of the invention has been realized.

The advantages of the invention are:
1. The rotating members of bearings are abrasive-resistant, and periodic maintenance is unnecessary;
2. No professional maintenance is needed, and being economized in expenses;
3. Very simple in mounting and dismantling, and tightness adjustment of the bearing is dispensable.

BRIEF DESCRIPTION OF THE DRAWINGS

Incorporating with the attached drawings, the invention shall be further described as follows.

FlG. 3 is a sectional view of third structure of the invention.

Figure 4:
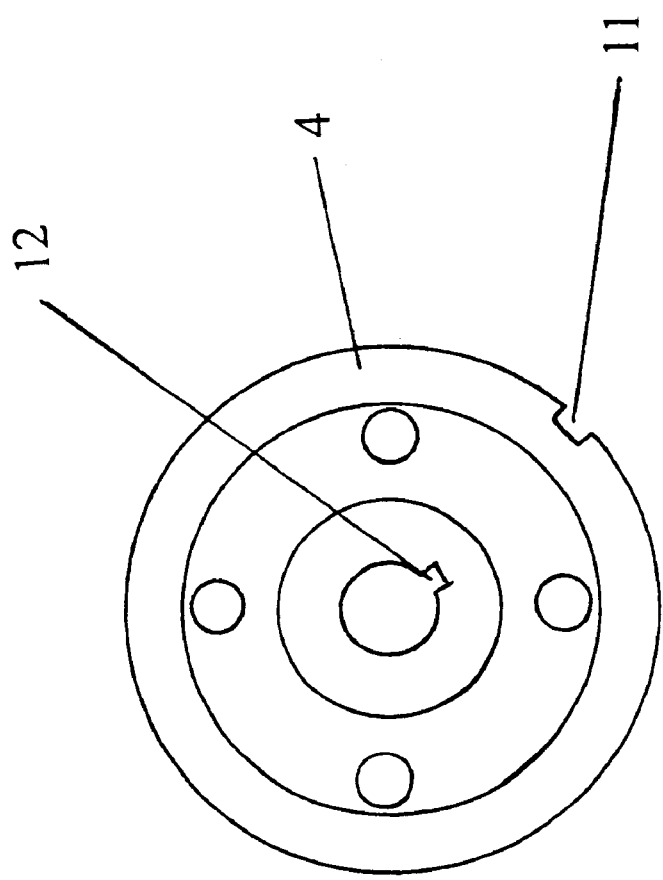

FIG. 4 is a cross sectional view of the structure of a bearing.

DETAILED DESCRIPTION OF THE PREFERRED EMBODIMENTS

In the drawings: 1-stepped shaft, 2-cap nut, 3-liner, 4-bearing, 5-bush, 6-bearing lock sleeve, 7-jacket, 8-round key on the shaft, 9-round key on the bearing lock sleeve, 10-dowel, 11-outer race keyway of the bearing, 12-inner race keyway of the bearing, 13-oil filler point.

Figure 1:
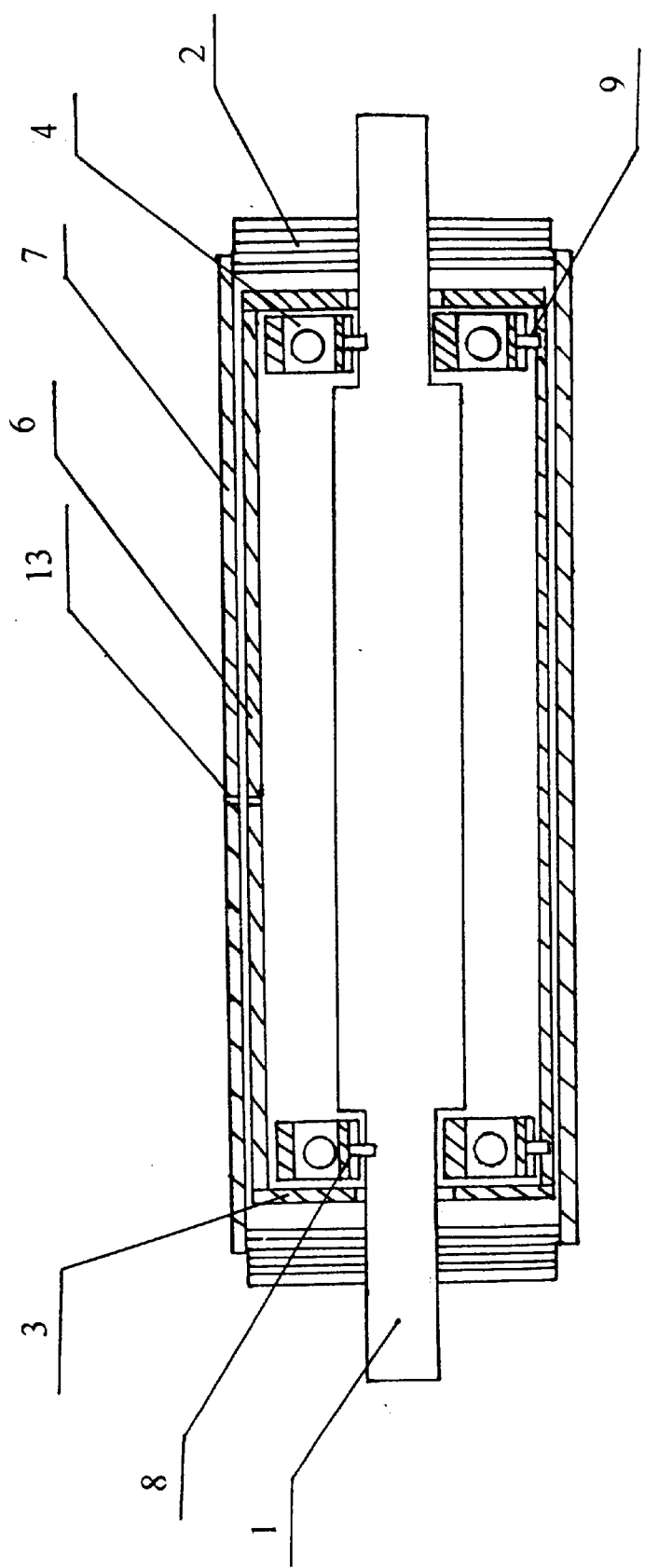
FIG. 1 is a sectional view of a structure of the invention.

A rotating shaft of the first structure in the invention is shown in FIG. 1, a stepped shaft 1, a bearing lock sleeve 6, a jacket 7 and bearings 4 are registered in succession, oil filler points 13 are set up onto jacket 7 and bearing lock sleeve 6 in correspondence, bearings 4 are located on both ends of the stepped shaft 1, and are registered into bearing lock sleeve 6. An inner race keyway 12 and an outer race keyway 11 are set up onto a bearing, a round key 8 is set up onto a stepped shaft, and a round key 9 is set up onto a bearing lock sleeve. A bearing inner race is matched with the stepped shaft via a round key 8, and a bearing outer race is matched with a bearing lock sleeve via a round key9. A liner 3 is installed outside a bearing 4, a cap nut 2 is located outside the liner 3 and the nut 2 is in fixed threaded connection with the jacket 7. The outer diameter of stepped shaft should be less than the inner diameter of bearing; the inner diameter of bearing lock sleeve should be greater than the outer diameter of bearing; their fit clearance being decided by machining precision, preferably to be less than 0.08 mm, and desirably less than 0.05 mm for higher machining precision. The length of bearing lock sleeve should be greater than the sum of the length of middle flanged part on the stepped shaft and thickness of two bearings, while the appropriate excessive length shall be 0.3–0.5 mm.

Figure 2:
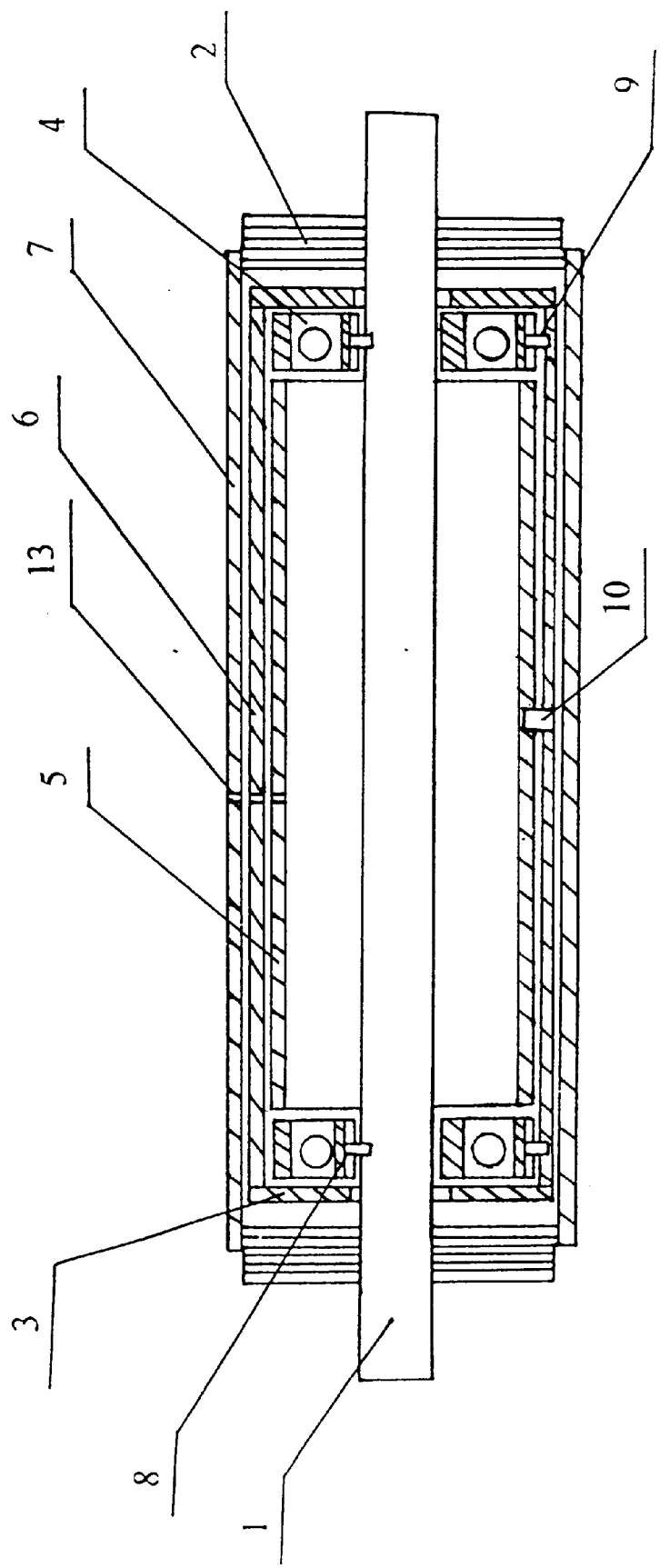
FIG. 2 is a sectional view of another structure of the invention.

A rotating shaft of the second structure in the invention is shown in FIG. 2, a shaft 1, a bush 5, a bearing lock sleeve 6, a jacket 7, bearings 4 are registered in succession, the bush 5 and the bearing lock sleeve 6 are in fixed connection via a dowel 10 and the oil filler points 13 are installed onto jacket 7, bearing lock sleeve 6 and bush 5 in correspondence. The structures of other parts in the rotating shaft are the same as the structures in another rotating shaft.

Figure 3:
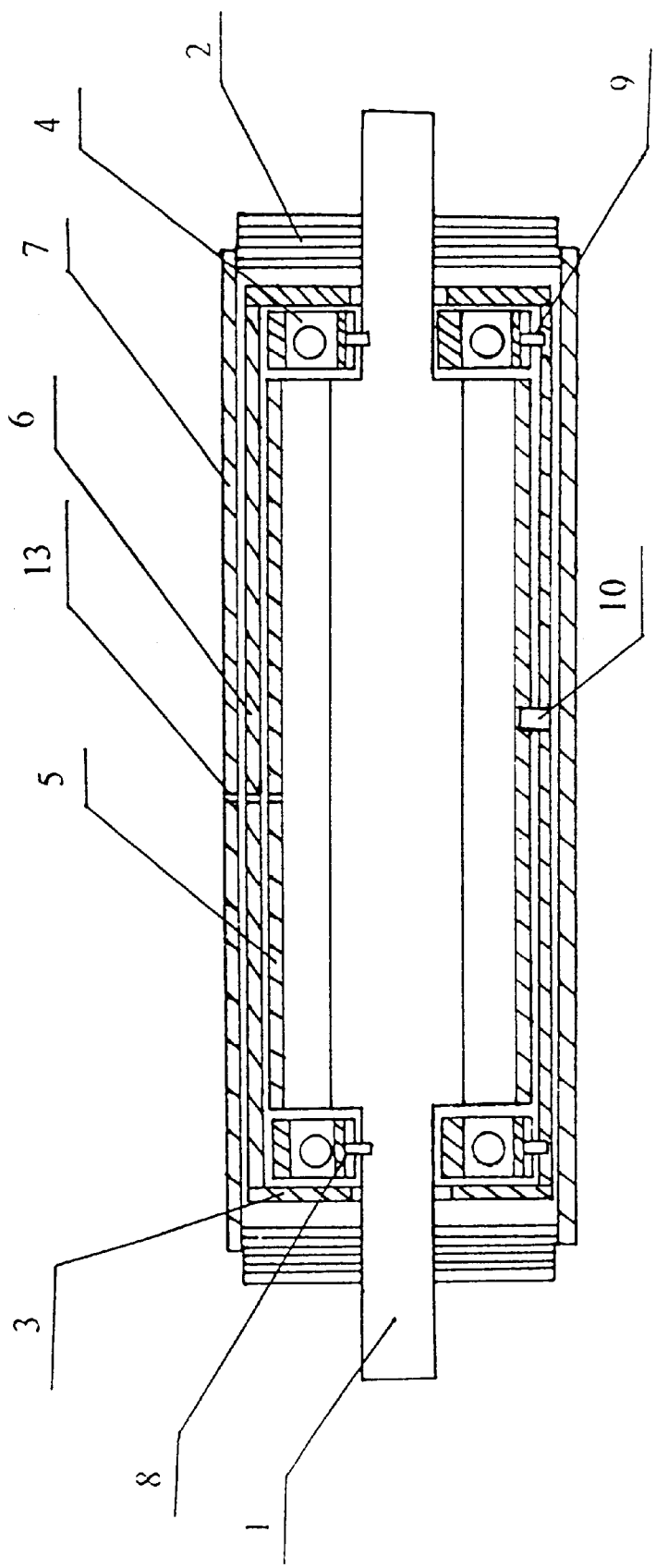

A rotating shaft of the third structure in the invention is shown in FIG.3, a stepped shaft 1, a bush 5, a bearing lock sleeve 6, a jacket 7, bearings 4 are registered in succession, the structures of other parts are the same as relevant parts in aforesaid first, second structures.

What is claimed is:

1. A rotating shaft, comprising a shaft, bearings, a bearing lock sleeve, a jacket, cap nuts and liners, said shaft is a stepped shaft, the diameter of middle flanged part on the stepped shaft is greater than the inner diameter of bearing inner race; said stepped shaft, bearings, bearing lock sleeve and a jacket are registered in succession, the bearing inner races are in movable fit with both ends of the stepped shaft, the bearing outer races are in movable fit with the bearing lock sleeve, the liners are installed outside the bearings, and cap nuts are in threaded connection with the jacket, inner and outer race keyways are installed onto said bearings, and round keys are set up onto said bearing lock sleeve in correspondence with the keyways, the round keys are fitted with the bearing outer race keyways; and round keyways are also installed onto said stepped shaft, they are fitted with the bearing inner race keyways, and are slidable in the keyways.

2. A rotating shaft according to claim 1, including oil filler points installed onto the jacket and bearing lock sleeve.

3. A rotating shaft, comprising a shaft, bearings, a bearing lock sleeve, a jacket, cap nuts and liners, characterized in that a bush is added, and a shaft, a bush, a bearing lock sleeve, a jacket and bearings are registered successively, in which said bush is invaginated into the bearing lock sleeve, sliding range of the bearings being restricted by the bush, while the bush and bearing lock sleeve are rigidly connected via a dowel, inner and outer race keyways are installed onto said bearings, and round keys are set up onto said bearing lock sleeve in correspondence with the keyways, the round keys are fitted with the bearing outer race keyways; and round keyways are also installed onto said stepped shaft, they are fitted with the bearing inner race keyways, and are slidable in the keyways.

4. A rotating shaft, comprising a stepped shaft, bearings, a bush, a bearing lock sleeve, a jacket, cap nuts and liners, said stepped shaft, bush, bearing lock sleeve, jacket and bearings are registered in succession, in which the bush length corresponds to the length of middle flanged part on the stepped shaft.

5. A rotating shaft according to claim 4, characterized in that inner and outer race keyways are installed onto said bearings, and round keys are set up onto said bearing lock sleeve in correspondence with the keyways, the round keys are fitted with the bearing outer race keyways; and round keyways are also installed onto said stepped shaft, they are fitted with the bearing inner race keyways, and are slidable in the keyways.

6. A rotating shaft according to claims 3 or 4, including oil filler points installed onto the jacket, bearing lock sleeve and liners.

7. A rotating shaft according to claims 1 or 4, characterized in that length of bearing lock sleeve is greater than the sum of the length of middle flanged part on the stepped shaft and the thickness of two bearings, its excessive portion being 0.3–0.5 mm.

* * * * *